United States Patent [19]

Premji

[11] Patent Number: 5,105,076
[45] Date of Patent: Apr. 14, 1992

[54] METHOD AND APPARATUS FOR DETECTING FOCUSING ERRORS UTILIZING CHROMATIC ABERRATION

[75] Inventor: Zahirudeen Premji, Boulder, Colo.
[73] Assignee: Nikon Corporation, Tokyo, Japan
[21] Appl. No.: 564,404
[22] Filed: Aug. 8, 1990
[51] Int. Cl.[5] .............................................. G01J 1/20
[52] U.S. Cl. .............................. 250/201.5; 369/44.37
[58] Field of Search .......................... 250/201.4, 201.5; 356/4; 369/44.11, 44.37, 44.41, 44.42

[56] References Cited

U.S. PATENT DOCUMENTS

| | | | |
|---|---|---|---|
| 4,450,547 | 5/1984 | Nakamura et al. | 250/204 |
| 4,600,831 | 7/1986 | Hutley | 250/201.4 |
| 4,725,721 | 2/1988 | Nakamura et al. | 250/201.5 |
| 4,815,058 | 3/1989 | Nakamura et al. | 250/201.5 |
| 4,970,707 | 11/1990 | Hara et al. | 369/44.11 |

Primary Examiner—David C. Nelms
Assistant Examiner—John R. Lee
Attorney, Agent, or Firm—Shapiro and Shapiro

[57] ABSTRACT

An objective lens having chromatic aberration is disposed in an optical system for focusing recording and/or reproducing light beams upon a surface of an optical disc, and two detecting light beams having different wavelengths are passed through the lens. When the surface of the optical disc is positioned at a focal point of one of the beams, the other beam is not focused on the optical disc. When the surface of the disc is positioned midway between the focal points of the two beams, two light spots formed on the optical disc by the two beams have equal intensity. The light intensity of the two spots is detected, so that focusing errors can be determined based on the difference between the detected intensities.

12 Claims, 5 Drawing Sheets

METHOD AND APPARATUS FOR DETECTING FOCUSING ERRORS UTILIZING CHROMATIC ABERRATION

BACKGROUND OF THE INVENTION

1. Field of the Invention

The present invention relates to a method and an apparatus for detecting focusing errors in the recording or reproducing of information on recording media such as optical discs.

2. Related Background Art

Optical discs have recently been put into practice, and are being further developed, as high density, random access information memories with short access time, and in which recording or reproducing can be performed without contacting the recording medium.

Optical discs may be divided into three categories: (1) a read only type exclusively used for reproducing, such as a compact disc or a laser disc, for example, (2) a write once, read many times type in which information can only be recorded once but can be repeatedly reproduced, and (3) an erasable type in which recorded information can be erased and in which information can be repeatedly recorded or reproduced, such as optical discs of the phase change type, the magnetooptical type or the photochromic type.

In these optical discs, information is recorded by causing two minute regions having optical properties different from each other to correspond to information units "1" and "0". The minute regions are about 1 $\mu$m in width and of various lengths. A shorter minute region is generally called a bit, a pit or a mark and is more prominent than a longer one. The longer region constitutes a ground or base of a recording track formed spirally or in coaxial circles. The bits, which are distributed along the tracks, can be constituted by projections, recesses, pits, magnetized regions having upward or downward magnetized directions, crystalline or noncrystalline regions, or regions having different colors.

When an optical disc is reproduced, the bits are irradiated by a light beam which is stopped down to a minimum and is focused to form a beam spot on the optical disc by an objective lens. The diameter of the smallest possible spot depends on the wavelength of the light beam. Since the wavelength of light obtained from a semiconductor laser is about 800 nm, the diameter of the smallest spot is, at the present time, about 1 $\mu$m. The smallest usable bit size is determined by the diameter of the smallest spot, and the smaller the bit size, the higher the recording density that is possible.

For proper focusing of the beam spot, the objective lens must always be positioned at a constant distance from the optical disc. This distance is commonly equal to the focal distance of the objective lens. Thus, the operation for positioning the objective lens at a predetermined position is called focusing. If the distance between the objective lens and the optical disc is shorter or longer than the focal distance, the diameter of the spot increases, thereby decreasing the S/N ratio and increasing the rate of reading errors.

The optical disc may be displaced upwardly or downwardly, due, for example, to warping of the optical disc, or to vibration of the shaft that rotates the optical disc. It is very difficult to keep the distance between the objective lens and the optical disc constant.

As set forth hereinafter, the present invention solves this problem by causing the objective lens to follow the vertical displacement of the surface of the optical disc. (It is difficult to cause an entire optical head, also called an optical pickup, which has an optical system including the objective lens, a light source, a photodetector, etc., to follow the displacement of the optical disc, because the head is heavy.) In order to cause the objective lens to follow the displacement of the surface of the optical disc, it is first necessary to detect the deviation of the disc surface from the focal point. The deviation is called a focusing error.

SUMMARY OF THE INVENTION

It is an object of the present invention to provide an improved method and apparatus for detecting focusing errors in recording or reproducing of information on recording media such as an optical disc.

It is a further object of the present invention to provide an improved method and apparatus for detecting a focusing error signal.

In accordance with one aspect of the present invention a lens having chromatic aberration is employed in an optical system that causes a light beam from a light source to focus on an optical disc. The lens is preferably employed as an objective. A lens having chromatic aberration has a focal distance which depends on wavelength. Two light beams having different wavelengths $\lambda_1$ and $\lambda_2$ are used for detecting focusing error and are focused on two different positions by causing the beams to pass through the lens having chromatic aberration. Thus when an optical disc is positioned at the focal point of one light beam, the other beam does not focus on the optical disc. As a result, the diameter of the spot of the other beam is greater than the smallest diameter, so that the light quantity per unit area is reduced. In the beam spot focused on the disc, the light quantity per unit area is relatively large.

Therefore, when an optical disc is positioned at a middle position that is midway between the focal points of the two beams, the light quantities per unit area of the two spots are equal to each other. The middle position is employed as a reference position. The optical system is designed so that the focal point of the reproducing beam or the recording beam is capable of coinciding with the reference position. If the difference of the light quantities per unit area (or quantities related thereto) of two spots of two detecting beams having wavelengths $\lambda_1$ and $\lambda_2$ is equal to zero, the optical disc is positioned at the reference position. Then, the reproducing beam or the recording beam focuses exactly on the surface of the optical disc. The amount of difference is equal to the deviation from the reference position.

In order to measure the light quantities per unit area (or quantities related thereto), a real image of a spot on the optical disc may be formed on the light receiving surface of a photodetector. The real image may be formed by focusing reflected light from the spot on the disc through a lens onto the light receiving surface. Since the light receiving surface of a photodetector is generally larger than the above-mentioned real image, a shielding plate having a pinhole opening may be disposed just in front of the light receiving surface. Thus, the light quantity per unit area (or a quantity related thereto) can be measured. When the reflected light from the spot is guided to the photodetector through an optical waveguide, the shielding plate having a pinhole opening is not necessary, because the end of the waveguide has a small diameter equal to that of the pinhole.

Assuming that "I" denotes an output signal of the photodetector, and is equal to the light quantity per unit area (or a quantity related thereto), when output $I_1$ for the wavelength $\lambda_1$ is equal to output $I_2$ for the wavelength $\lambda_2$, the optical disc is positioned at the reference position. Two light sources may be used to produce two different wavelengths, and the two light sources may have the same structures; for example, they may be semiconductor lasers. In this case, different control factors may be used so that one of the sources emits a beam having wavelength $\lambda_1$ and the other emits a beam having wavelength $\lambda_2$. For example, the temperature of the surroundings may be used as a control factor. In order to control the temperature of the surroundings, elements having the Peltier effect, for example, may be disposed beside the light sources.

According to one aspect of the present invention, the times when the optical disc is irradiated by the beams having wavelengths $\lambda_1$ and $\lambda_2$ respectively, or the times when the light quantities per unit area of the two spots (or quantities related thereto) are measured may be different, if the difference between these times is very short. Then, it is possible to use one light source or one photodetector for producing or detecting two beams. The control factor for a single light source may be changed with time, to produce two beams of different wavelengths. On the other hand, two light sources may be used with one photodetector for detecting two beams.

DESCRIPTION OF THE PREFERRED EMBODIMENTS

First the principle of detection of focusing errors according to the present invention will be described.

Figure 1:
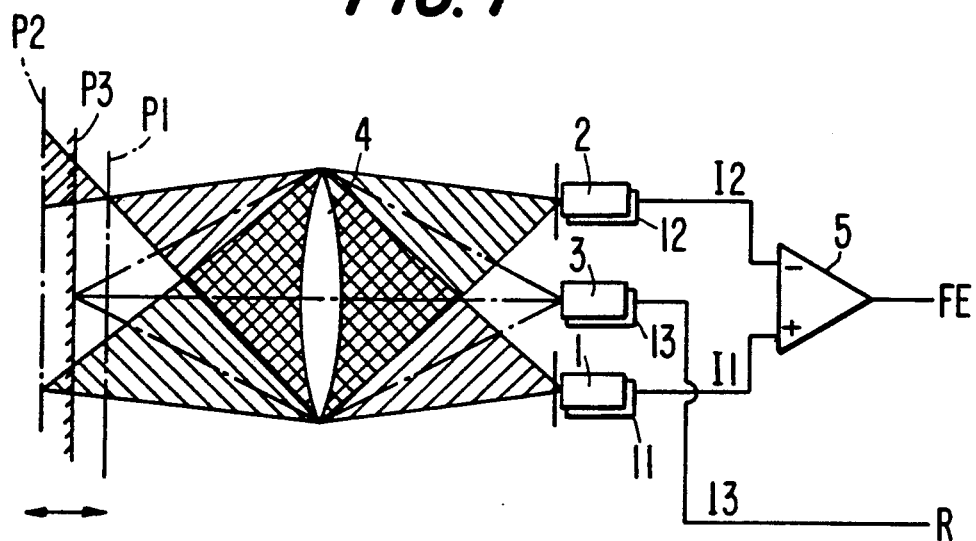
FIG. 1 is a schematic view illustrating the principle of detection of focusing errors according to the present invention.

In FIG. 1 three light sources 1, 2 and 3 have exit planes on a common plane orthogonal to an optical axis, and emit light beams having different wavelengths $\lambda_1$, $\lambda_2$, and $\lambda_3$, respectively, having a relation of $\lambda_1 < \lambda_3 < \lambda_2$. The light sources preferably comprise three semiconductor lasers, or a semiconductor laser constituted by a monolithic array. The light beams from the light sources 1 and 2 are used for detecting focusing errors, while the light beam from the light source 3 is used for reading or writing.

Light beams from the three light sources are projected on an objective lens 4 having chromatic aberration. Images of the exit planes of the light sources 1, 2 and 3 are formed as beam spots on the planes P1, P2 and P3 through the objective lens 4 in accordance with the chromatic aberration. The wavelengths $\lambda_1$, $\lambda_2$, and $\lambda_3$ of the light beams are related so that the planes P1 and P2 are spaced from the plane P3 at opposite sides thereof.

Light reflected from the beam spots on the planes P1, P2 and P3 passes through the objective lens 4 and is received by photodetectors 11, 12 and 13, respectively, having light receiving planes on the exit planes of the light sources 1, 2 and 3, respectively, or at positions equivalent thereto. The photodetectors measure light quantity per unit area of respective images (or a quantity related thereto). Shielding plates having a pinhole opening are disposed in front of photodetectors 11 and 12. Outputs $I_1$ and $I_2$ of the photodetectors 11 and 12 are connected to two inputs of a differential amplifier 5, respectively. Output $I_3$, from the photodetector 13 is sent to a reading or writing apparatus (not shown).

Assume that the light intensity of the beam from the light source 1 is equal to that of the beam from the source 2 and the exit areas of these light sources are equal to each other. When the surface of the optical disc coincides with the plane P3, the light intensity of the beams from the light sources 1 and 2, reflected from the surface of the optical disc and projected through the objective lens 4 onto photodetectors 11 and 12, respectively, are equal. Then, the optical disc is at the reference position and $I_1 = I_2$. As the surface of the optical disc moves from the plane P3 toward the plane P1, the light intensity of the beam incident upon the photodetector 11 increases and $I_1 > I_2$. Conversely, as the surface of the optical disc moves toward the plane P2, the light intensity of the beam incident upon the photodetector 11 decreases and $I_1 < I_2$. Therefore, it is possible to determine focusing errors of the light beam from the light source 3 for reading or writing, from the output FE of the differential amplifier 5.

Figure 2A:
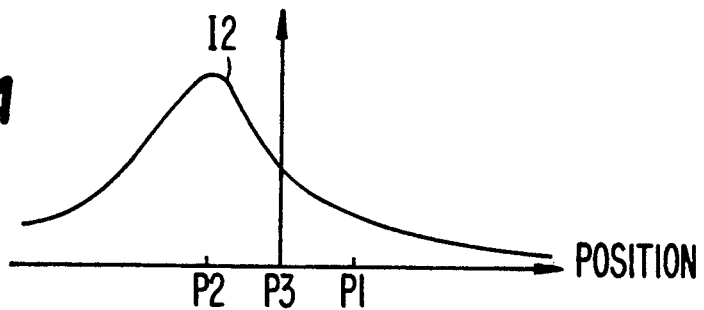
FIG. 2A is a graph showing an output signal $I_2$ from a photodetector.
Figure 2B:
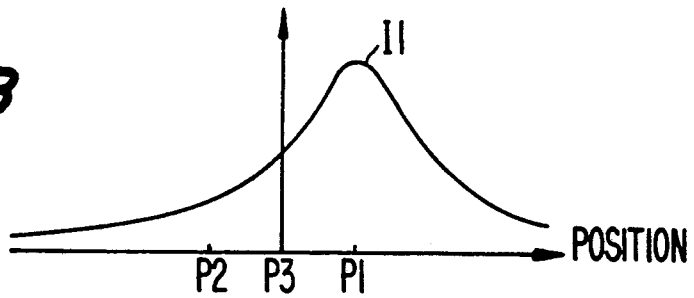
FIG. 2B is a graph showing an output signal $I_1$ from a photodetector.
Figure 2C:
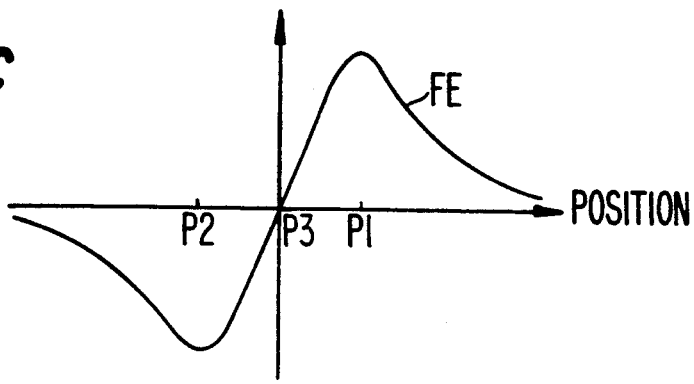
FIG. 2C is a graph showing a focusing error signal FE.

FIGS. 2A and 2B show the changes which occur in the outputs $I_2$ and $I_1$, respectively, when the surface of the optical disc is moved with respect to the objective lens 4. FIG. 2C shows the output from the differential amplifier, that is, the focusing error signal FE.

Figure 3:
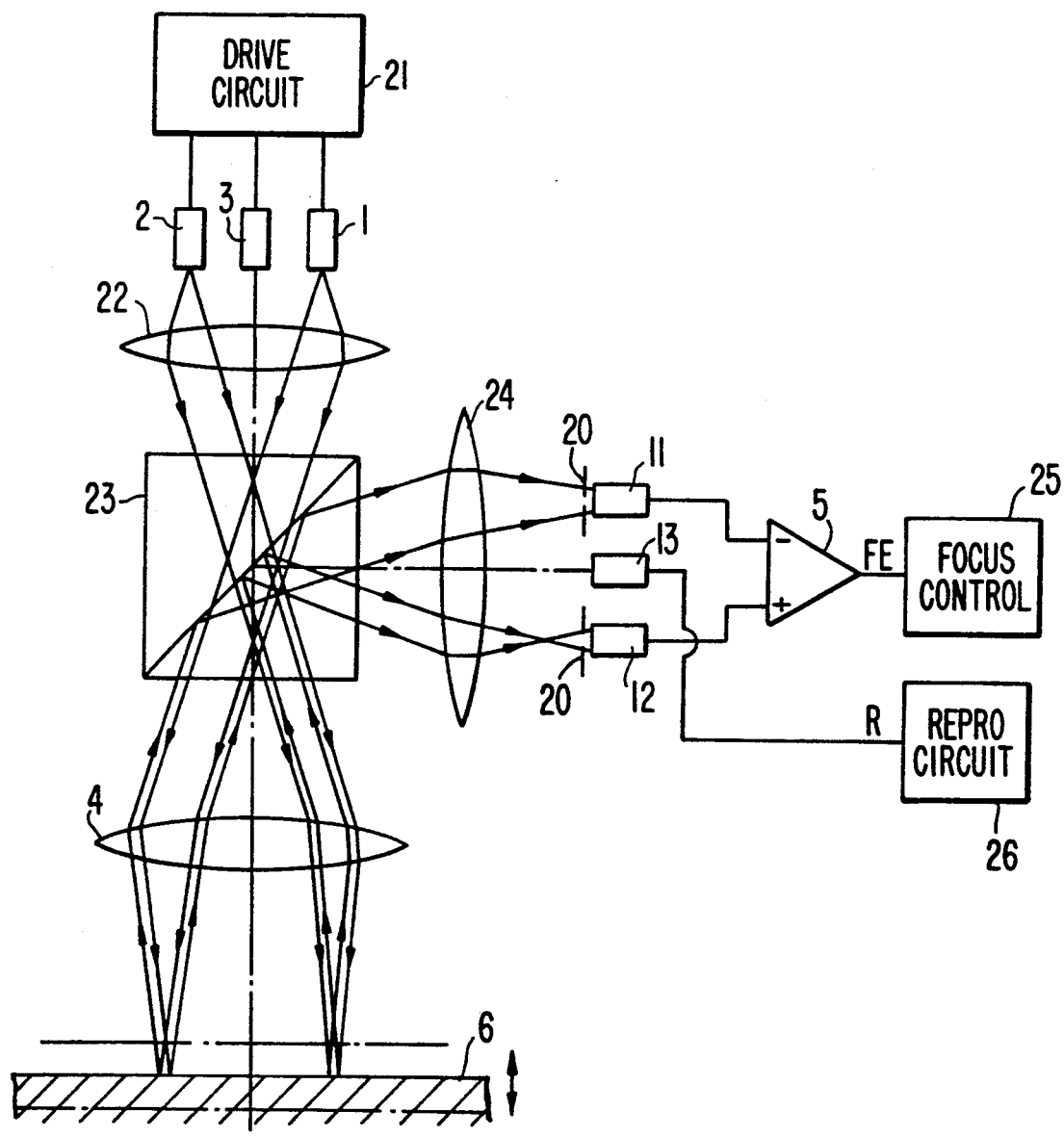
FIG. 3 is a diagram of an optical system of a detecting apparatus according to a first embodiment of the present invention, and of a signal processing unit thereof.

The first embodiment of the present invention will now be described with reference FIG. 3.

The light sources 1, 2 and 3 are driven to emit light by a drive circuit 21. Light beams having wavelengths $\lambda_1$, $\lambda_2$, and $\lambda_3$ which are emitted from the light sources, are collimated by a collimator lens 22 so as to arrive at an optical disc 6 through a beam splitter 23 and an objective lens 4 having chromatic aberration. Each beam is incident upon the optical disc 6 perpendicularly so that the reflected light from the disc returns toward the light sources. The reflected light from the disc surface is separated by the beam splitter 23 and is condensed on the light receiving plane of each of photodetectors 11, 12 and 13 by a condenser lens 24. A light shielding plate 20 having a pinhole is disposed in front of each of photodetectors 11 and 12. The light receiving planes of the photodetectors 11, 12 and 13 are formed so as to have areas equal to each other. The disc 6 and the light receiving planes of the photodetectors are at positions optically conjugate with respect to the lenses 4 and 24, and the image of each light spot on the disc 6 is formed on the corresponding light receiving plane.

The output FE from the differential amplifier 5 is sent to a focus control 25 for controlling movement of the objective lens to the reference position. An output R from the photodetector 13 is sent to a reproduction circuit 26.

Although in this embodiment, as described, detection of focusing errors utilizes the chromatic aberration of the objective lens 4, it is possible to utilize the chromatic aberration of both the objective lens 4 and the collimator lens 22, or to use an objective lens having no chromatic aberration and a collimator lens having chromatic aberration.

Figure 4:
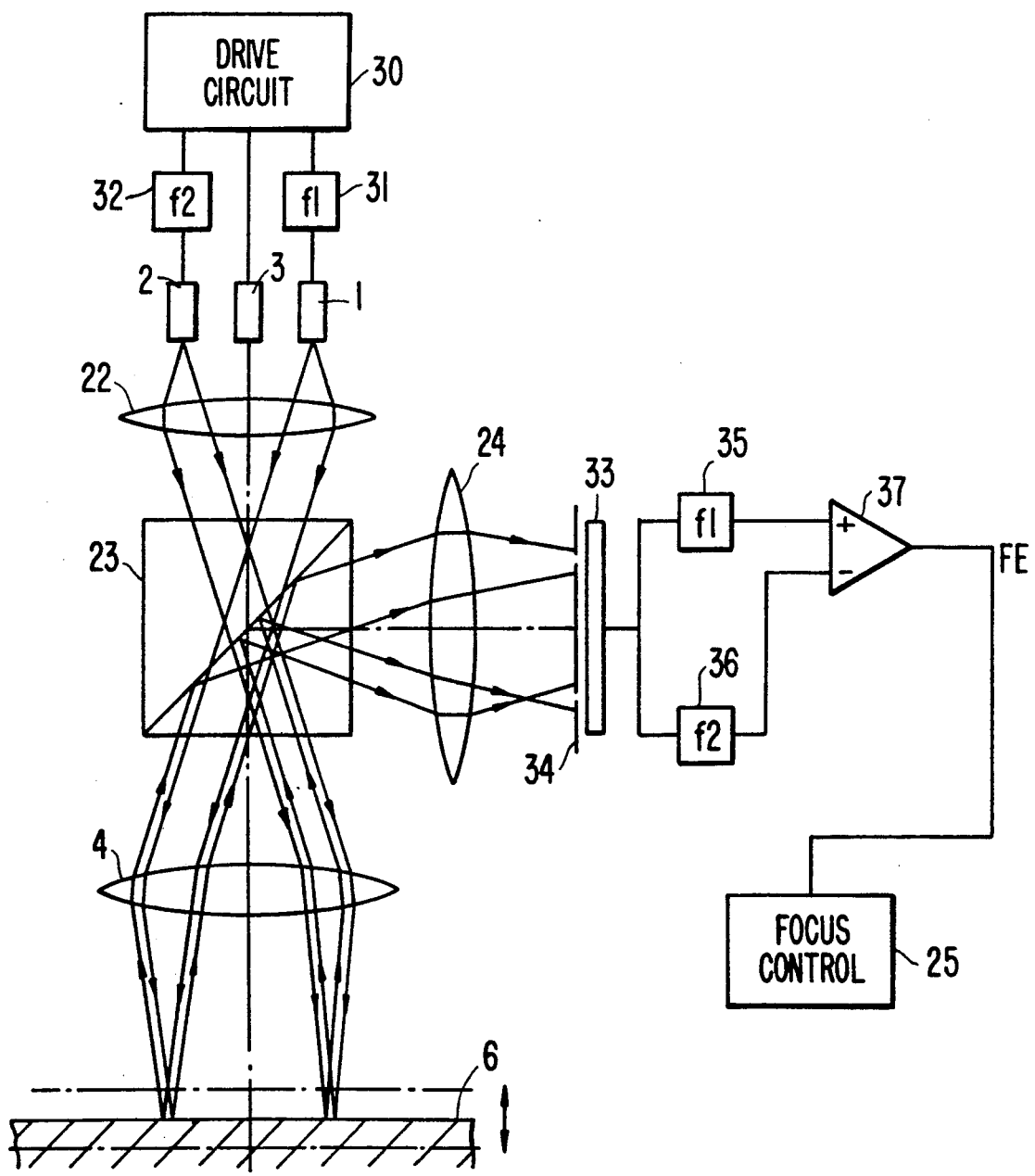
FIG. 4 is a diagram of an optical system of a detecting apparatus according to a second embodiment of the present invention, and of a signal processing unit thereof.

A second embodiment of the present invention will be described with reference to FIG. 4. In FIG. 4 members functionally similar to those in FIG. 3 are given similar reference numerals, and photodetectors for reading or writing are not shown.

A frequency modulator 31 is disposed between a drive circuit 30 and a light source 1. The light beam having wave length $\lambda_1$, which is emitted from the light source 1, is modulated by a frequency F1. Similarly, a frequency modulator 32 is disposed between the drive circuit and a light source 2. The light beam having wavelength $\lambda_2$, which is emitted from the light source 2, is modulated by a frequency f2. The beam from the source 1 and the beam from the source 2 are received by a common photodetector 33. A light shielding plate 34 having two pinholes of equal diameters is disposed in front of the photodetector 33. The beam from the source 1 and the beam from the source 2 are separately incident upon the photodetector 33 through these pinholes.

The output from the photodetector 33 is sent to differential amplifier 37 through a bandpass filter 35 through which the frequency fl can pass, and through a bandpass filter 36 through which the frequency f2 can pass. Light beams from both sources 1 and 2 are set to have the same power, and the focusing error signal FE is obtained from the resultant output from the differential amplifier 37.

Next, a third embodiment of the present invention will be described with reference to FIGS. 5 to 8.

The apparatus according to this embodiment comprises a single semiconductor laser (and a single photodetector) capable of generating alternately a plurality of wavelengths by utilizing the property of temperature dependence of the output wavelength of the semiconductor laser.

Figure 5:
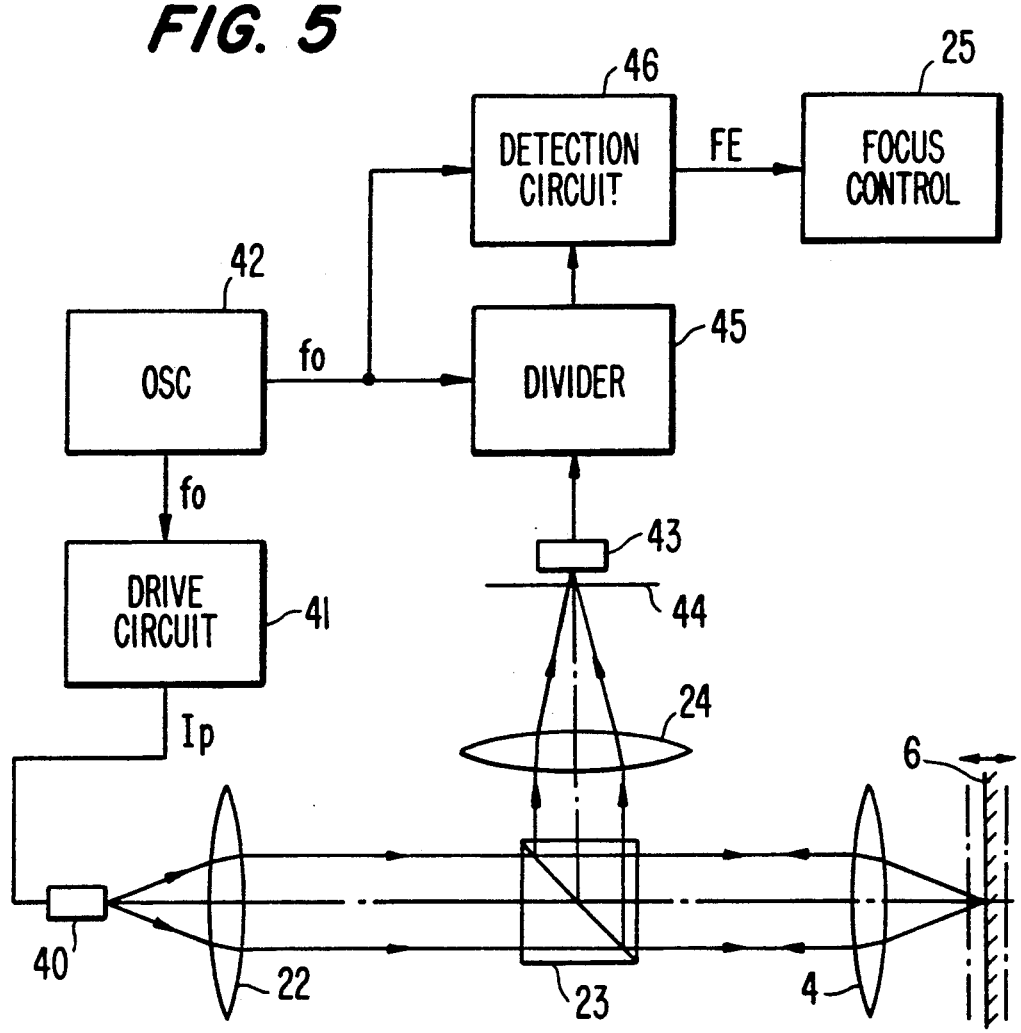
FIG. 5 is a diagram of an optical system of a detecting apparatus according to a third embodiment of the present invention, and of a signal processing unit thereof.

In FIG. 5 a light source 40 constituted by the semiconductor laser is driven by alternating current $I_P$ of a drive circuit 41. The output wavelength of the semiconductor laser is generally temperature dependent in the oscillation region so that the output wavelength may be shifted toward the longer wavelength side at elevated temperature. The temperature in the oscillation region is raised by increasing the injection current sent to the semiconductor laser, and the wavelength is shifted toward the longer wavelength side. The wavelength is shifted toward the shorter wave-length side with a decrease in injection current.

The drive circuit 41 generates alternating current $I_P$ intensity modulated by an oscillation frequency f0 of an oscillator 42. The temperature of the light source 40 changes at a rate corresponding to the frequency f0 of alternating current $I_P$. The light source 40 emits a light beam having wavelength $\lambda_2$ at elevated temperature and emits a light beam having a wavelength $\lambda_1$ at lower temperature.

The light beam from the light source 40 arrives at the surface of the optical disc 6 through the collimator 22, the beam splitter 23 and the objective lens 4 having chromatic aberration. The beam reflected from the disc surface passes through the pinhole of a shielding plate 44 along a path similar to that in each of the above-mentioned embodiments and is received by the photodetector 43 so that the intensity of the light beam can be detected.

Figure 6:
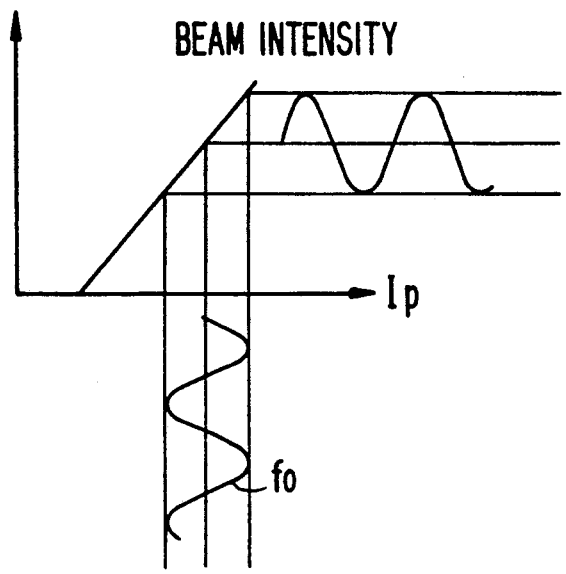
FIG. 6 is a graph showing oscillation frequency versus intensity of a light beam.

As shown in FIG. 6 the intensity of the light beam from the light source 40 changes in response to variation in driving current $I_P$. Therefore, a divider 45 is employed, by which the intensity of the reflected beam received by the photodetector 43 is adapted to be normalized in accordance with the oscillation frequency f0 of the oscillator 42. The beam intensity signal normalized by the divider 45 is sent to a detection circuit 46. The output from the divider 45 is detected in synchronization with the frequency f0 of the oscillator 42.

Figure 7A:
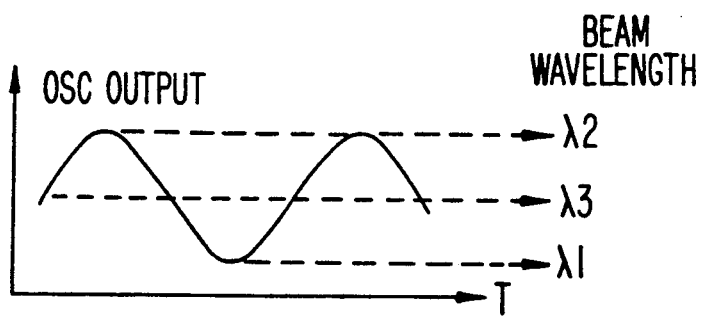
FIG. 7A is a graph showing the output waveform of an oscillator.
Figure 7B:
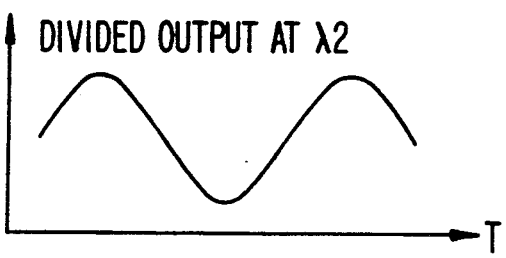
FIGS. 7B, 7C and 7D are graphs of output waveforms of a divider.
Figure 7C:
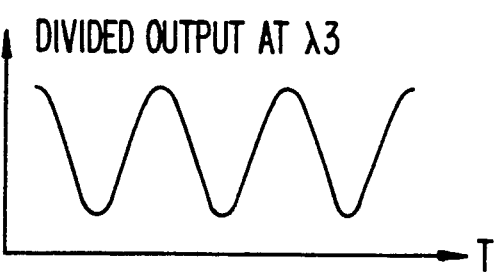
Figure 7D:
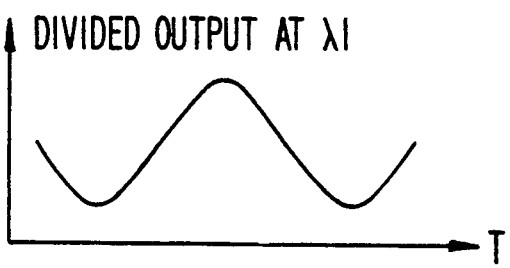

As shown in FIG. 7A the wavelength of the light beam is $\lambda_1$ at the bottom of the output of the oscillator 42 and is $\lambda_2$ at the peak. The wavelength $\lambda_3$, at the middle point between the bottom and the peak is equal to the wavelength for reading or writing. FIGS. 7B, 7C and 7D show output waveforms of the divider 45 which are obtained when beams having wavelengths $\lambda_2$, $\lambda_3$, and $\lambda_1$, are focused on the surface of the disc, respectively. It is clear from these Figures, that each output level can be easily detected by synchronous detection because the output waveforms from the divider 45 are phase reversed at wavelengths $\lambda_1$ and $\lambda_2$.

Figure 8:
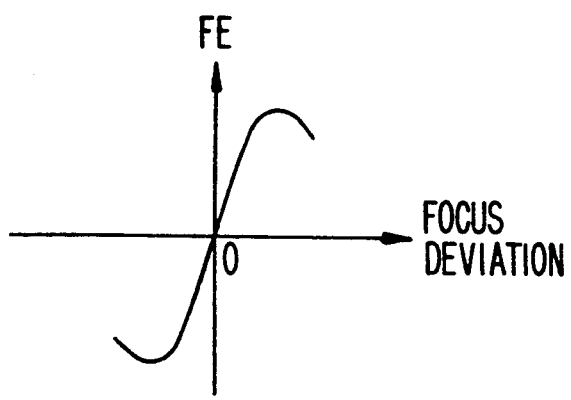
FIG. 8 is a graph showing the relation between displacement of a disc and a focusing error signal FE.

The focusing error signal FE as shown in FIG. 8 is generated from the detection circuit 46 and is sent to the focus control 25.

In this embodiment, it is also possible to alternate wavelengths of the light beam by alternating the temperature of the light source, instead of alternating injection current. Light source temperature can be alternated using elements having the Peltier effect. In this case, light beam intensity is not varied, and the divider 45 is not necessary. The focusing error signal FE as shown in FIG. 8 can be obtained.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. An apparatus for detecting focusing errors upon a recording medium comprising:
    light source means for supplying first and second light beams having different wavelengths, said light source means including a first light source for emitting the first light beam and a second light source for emitting the second light beam;
    an optical system including a member having chromatic aberration, said system being disposed between said light source means and said recording medium for transmitting said first and second beams to a surface of said recording medium;
    detection means for detecting the intensity of light of the first and second beams returned from the surface of said recording medium; and determining means for determining focusing errors of said optical system with respect to said surface based on the difference between the detected light intensities.

2. An apparatus according to claim 1 wherein each of said first and second light sources has an exit plane arranged on a common plane substantially perpendicular to an optical axis of said optical system.

3. An apparatus according to claim 1 wherein said light source means has an exit plane from which said first and second beams are emitted, and said optical system projects the image of said exit plane near the surface of said recording medium.

4. An apparatus according to claim 3 wherein said detection means includes a detecting plane and condenser means for condensing said first and second beams returned from said recording medium upon said detecting plane.

5. An apparatus according to claim 4 wherein said detection means includes a first detector for generating an output corresponding to the light intensity of said first beam and a second detector for generating an output corresponding to the light intensity of said second beam, and said determining means determines said focusing errors based on the difference between the output of said first detector and the output of said second detector.

6. An apparatus for detecting focusing errors upon a recording medium comprising:
   means for supplying first and second beams having different wavelengths;
   modulation means for modulating said first and second beams by first and second frequencies different from each other, respectively;
   an optical system including a member having chromatic aberration, said system being disposed between said light source means and said recording medium so as to transmit said beams to a surface of said recording medium;
   light receiving means for receiving light of said first and second beams returned from the surface of said recording medium so as to generate corresponding outputs including components of said first and second frequencies;
   means for separating said first and second frequency components from the outputs of said light receiving means; and
   determining means for determining focusing errors of said optical system with respect to the surface of said recording medium based on the difference between separated first and second frequency components.

7. A method for detecting focusing errors comprising the steps of:
   (a) simultaneously impinging first and second light beams having different wavelengths on a surface of a recording medium through an optical system including a member having chromatic aberration;
   (b) detecting the intensity of light of the first beam and the intensity of light of the second beam returned from said recording medium; and
   (c) determining focusing errors of said optical system with respect to said surface of said recording medium based upon the difference between the detected light intensities of said beams.

8. A method for detecting focusing errors comprising the steps of:
   (a) alternately impinging first and second light beams having different wavelengths on a surface of a recording medium through an optical system including a member having chromatic aberration;
   (b) alternately detecting the intensity of light of the first beam and the intensity of light of the second beam returned from said recording medium; and
   (c) determining focusing errors of said optical system with respect to said surface of said recording medium based upon the difference between the detected light intensities of said beams.

9. An apparatus for detecting focusing errors upon a recording medium comprising:
   light source means for supplying first and second light beams having different wavelengths, said light source means including a single light source for emitting said first and second beams alternately at a predetermined control frequency;
   an optical system including a member having chromatic aberration, said system being disposed between said light source means and said recording medium for transmitting said first and second beams to a surface of said recording medium;
   detection means for detecting the intensity of light of the first and second beams returned from the surface of said recording medium, said detection means detecting the light intensity of the returned beams alternately at said predetermined control frequency; and
   determining means for determining focusing errors of said optical system with respect to said surface based on the difference between the detected light intensities.

10. An apparatus according to claim 9, wherein said light source means includes a semiconductor laser and means for feeding thereto periodic current having said predetermined control frequency.

11. An apparatus according to claim 9, wherein said detection means includes a first detector for generating an output corresponding to the light intensity of said first beam and a second detector for generating an output corresponding to the light intensity of said second beam, and said determining means determines said focusing errors based on the difference between the output of said first detector and the output of said second detector.

12. An apparatus according to claim 9, wherein said light source means has means for varying its temperature and thereby varying the wavelength.

* * * * *